United States Patent
Klassen

(10) Patent No.: US 12,171,305 B1
(45) Date of Patent: Dec. 24, 2024

(54) FOOTWEAR ENERGY RETURN DEVICE WITH STABILITY CONTROL

(71) Applicant: 1158990 B.C. Ltd., Surrey (CA)

(72) Inventor: James Brent Klassen, Osoyoos (CA)

(73) Assignee: 1158990 B.C. Ltd., Surrey (CA)

(*) Notice: Subject to any disclaimer, the term of this patent is extended or adjusted under 35 U.S.C. 154(b) by 0 days.

(21) Appl. No.: 18/408,455

(22) Filed: Jan. 9, 2024

Related U.S. Application Data

(60) Provisional application No. 63/601,214, filed on Nov. 20, 2023.

(51) Int. Cl.
| | |
|---|---|
| *A43B 7/32* | (2006.01) |
| *A43B 7/142* | (2022.01) |
| *A43B 7/144* | (2022.01) |
| *F16F 1/36* | (2006.01) |

(52) U.S. Cl.
CPC ............... *A43B 7/32* (2013.01); *A43B 7/142* (2013.01); *A43B 7/144* (2013.01); *F16F 1/36* (2013.01)

(58) Field of Classification Search
CPC ........................................................ F16F 1/36
See application file for complete search history.

(56) References Cited

U.S. PATENT DOCUMENTS

| | | | |
|---|---|---|---|
| 8,707,582 B2 | 4/2014 | Klassen et al. | |
| 9,500,245 B2 | 11/2016 | Klassen | |
| 11,330,860 B2 | 5/2022 | Klassen | |
| 2007/0119074 A1* | 5/2007 | Aveni | A43B 21/26 36/27 |
| 2009/0126224 A1* | 5/2009 | Greene | F16F 1/373 36/35 R |
| 2013/0118033 A1* | 5/2013 | Smaldone | A43B 13/181 36/102 |

FOREIGN PATENT DOCUMENTS

| | | | |
|---|---|---|---|
| KR | 200398724 Y1 | * | 10/2005 |
| KR | 20130127341 A | * | 11/2013 |

\* cited by examiner

*Primary Examiner* — Melody M Burch
(74) *Attorney, Agent, or Firm* — Seed IP Law Group LLP

(57) ABSTRACT

An energy return device for footwear has a flattenable conical disk with a ring spring arranged around the base of the conical disk. A rigid upper heel-receiving plate is connected to the apex of the flattenable conical disk. The heel-receiving plate may be rigidly or semi-rigidly attached to the apex of the conical disk to stabilize an angle of the heel-receiving plate. There may be a conical damping disk between a lower surface of the heel-receiving plate and an upper surface of the conical disk. There may be protrusions on the bottom of the heel-receiving plate which interact with pockets in the upper surface of the conical disk, for example distorting the conical damping disk. There may be viscoelastic inserts in the pockets, for example providing damping in place of or in addition to the damping disk.

30 Claims, 19 Drawing Sheets

FOOTWEAR ENERGY RETURN DEVICE WITH STABILITY CONTROL

TECHNICAL FIELD

Shoes with energy return.

BACKGROUND

The inventor has previously disclosed footwear energy return devices, for example using a conical disk with a ring spring.

SUMMARY

An energy return device for footwear is disclosed. The energy return device includes a flattenable conical disk having a base having an outer diameter (OD) 1030 (see FIGS. 2A and 2B), an apex generally radially centered within the outer diameter, and an upper surface, and a ring spring arranged around the OD 1030 of the base of the flattenable conical disk, the ring spring arranged to be circumferentially elongated when the device is compressed under a weight of a user against ground contact force to flatten the conical disk. In an embodiment, a rigid heel-receiving plate is connected to the apex of the flattenable conical disk to receive a user's heel. The heel-receiving plate may be rigidly attached to the apex of the conical disk; for example, it may be attached sufficiently rigidly that the conical disk must deform in order for the heel plate to change angle relative to the base of the conical disk.

The apex may be radially inward from a live hinge forming a part of the conical disk. The live hinge may be adapted to allow symmetric flexing of the conical disk around the apex, while resisting tilting of the apex. In an embodiment, the flattenable conical disk may have a conical disk through-hole at the apex, and the heel-receiving plate may have a corresponding through-hole arranged to couple with the conical disk through-hole.

The attachment of the heel-receiving plate to the flattenable conical disk may be achieved by fastening together the heel-receiving plate and the flattenable conical disk. Where there are respective through-holes, a fastener may connect the heel-receiving plate to the conical disk via the respective through-holes so that the conical disk must deform in order for the heel-receiving plate to change angle relative to the base of the conical disk.

In embodiments with a fastener, the fastener may include for example a bolt and a nut, or a rivet. In either case, the apex of the flattenable conical disk may include a live hinge, and a lower end of the fastener, e.g. a lower end of the rivet or the lower of the bolt and nut, may include a flange that extends to the live hinge. The flange may have a feature that extends into a recess of the conical disk that defines the live hinge. The bottom of the fastener may contact and compress a damper at or near full compression of the flattenable conical disk. In an embodiment, either of the fastener or the damper, or both, have a non-flat interacting surface (lower surface for the fastener, upper surface for the damper) to interact with the other surface progressively. The fastener may have an orifice to allow air flow in and out of the disk via the respective through-holes.

In other embodiments of the energy return device, the heel-receiving plate and the flattenable conical disk may comprise a contiguous piece of material.

The ring spring may have a radially outer surface having a conical shape; for example the ring spring may be radially thicker toward the bottom than the top.

The heel-receiving may be longer in a fore-aft direction than it is from side to side. The heel-receiving plate may have an upper surface with a shape configured to support a human foot arch.

The lower surface of the heel-receiving plate may be convex. The convex lower surface may define a reference plane by an orientation of the convex surface adjacent to the apex and the convex lower surface may angle away from the reference plane more gradually on at least one of a left portion or a right portion of the convex surface than on at least one of a forward portion of the convex surface or a rearward portion of the convex surface. The left and right portions of the convex lower surfaces of the heel-receiving plate may come into contact with an upper surface of the flattenable conical disk at full compression of the device, or in contact with an intermediate structure in contact with the upper surface of the conical disk at full compression. A compressible and/or deformable material may be located between the lower surface of the heel-receiving plate and an upper surface of the flattenable conical disk. The compressible and/or deformable material may be compressed and/or deformed at full compression as a result of interference with the upper surface of the conical disk and lower surface of the upper plate.

There may be a conical damping disk of viscoelastic material between a lower surface of the heel-receiving plate and an upper surface of the flattenable conical disk.

The flattenable conical disk may have an upper surface having pockets. In an example, the pockets may extend in a generally radial direction and be separated by generally radial walls, at least a wall of the generally radial walls having a cross-section of material at at least a radial distance from the apex that is smaller than a cross-section of void, at the radial distance from the apex, within a pocket adjacent to the at least a wall. The heel-receiving plate may have a lower surface having one or more downward-facing protrusions arranged to interact with the flattenable conical disk. The protrusions may protrude into the pockets in the upper surface of the flattenable conical disk at full compression of the flattenable conical disk.

The embodiment with the protrusions may be combined with the conical damping disk such that the protrusions cause the conical damping disk of viscoelastic material to elongate circumferentially as the flattenable conical disk nears full compression. The viscoelastic conical damping disk may be secured to the OD of the flattenable conical disk. The viscoelastic damping disk may then act as a seal between the OD of the flattenable conical disk and a lower plate, for example to prevent debris or water ingress.

The embodiment with the protrusions may alternatively or additionally be combined with viscoelastic compressible and/or deformable material in one or more of said pockets, for example such that the protrusion on the lower surface of the heel-receiving plate interfere with the compressible and/or deformable material in the pockets as the flattenable conical disk is compressed. Where the conical damping disk and the compressible and/or deformable material are both present, the conical damping disk may be extended at the same time as the viscoelastic compressible and/or deformable material is compressed and/or deformed. The flattenable conical disk and the upper plate may have complementary angular alignment features.

In any of the above embodiments with protrusions, the downward protrusions may be vertically longer away from the apex.

The flattenable conical disk may be rotationally asymmetric. For example, the conical disk may have one or more pockets and one or more slots, the slots being circumferentially narrower than the pockets.

The device may include a dome dome-shaped annular stabilizing spring, and an annular damper, the cross-sectional profile of the stabilizing spring having an outermost outer diameter end which points away from an upper surface of the flattenable conical disk, the stabilizing spring being arranged to share an axis with the conical disk and be sandwiched between the heel-receiving plate and the flattenable conical disk, the stabilizing spring having a cross-sectional profile having an outermost outer diameter rim which points away from an upper surface of the flattenable conical disk, the damper being arranged to share an axis with the conical disk and to be sandwiched between the stabilizing spring and the conical disk, the stabilizing spring being arranged to press against the upper surface of the conical disk when the heel-receiving plate is tilted or compressed.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

It has been observed through testing with a range of users, that providing resistance to foot inversion and eversion angulation results in a sensation which is more similar to a conventional shoe and thus more familiar to a typical user than a shoe which allows free angulation of the foot in the inversion and eversion directions.

In embodiments in this document there are disclosed a multitude of strategies to achieve a significant level of angular stability.

Figure 1:
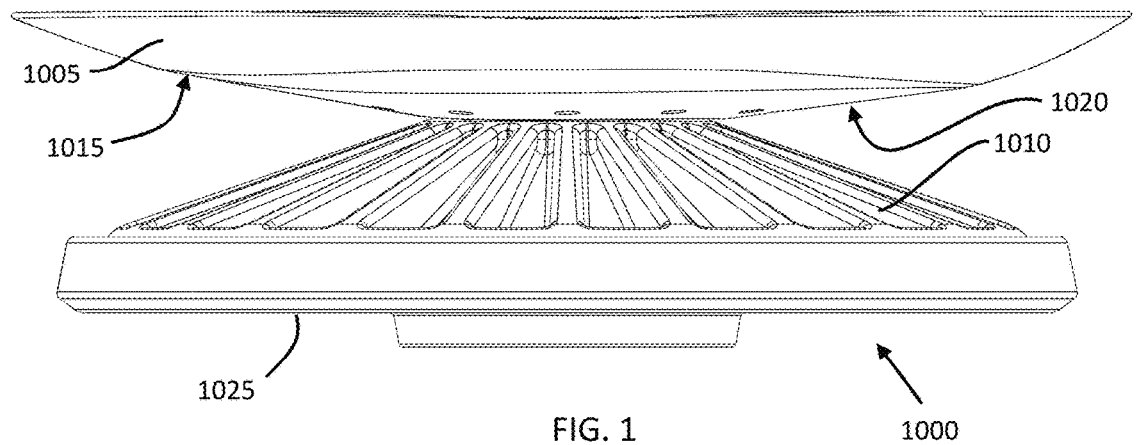
FIG. 1 is a side view of a shoe spring assembly comprising a conical disk and a foot-receiving plate for installation within a shoe.
Figure 2A:
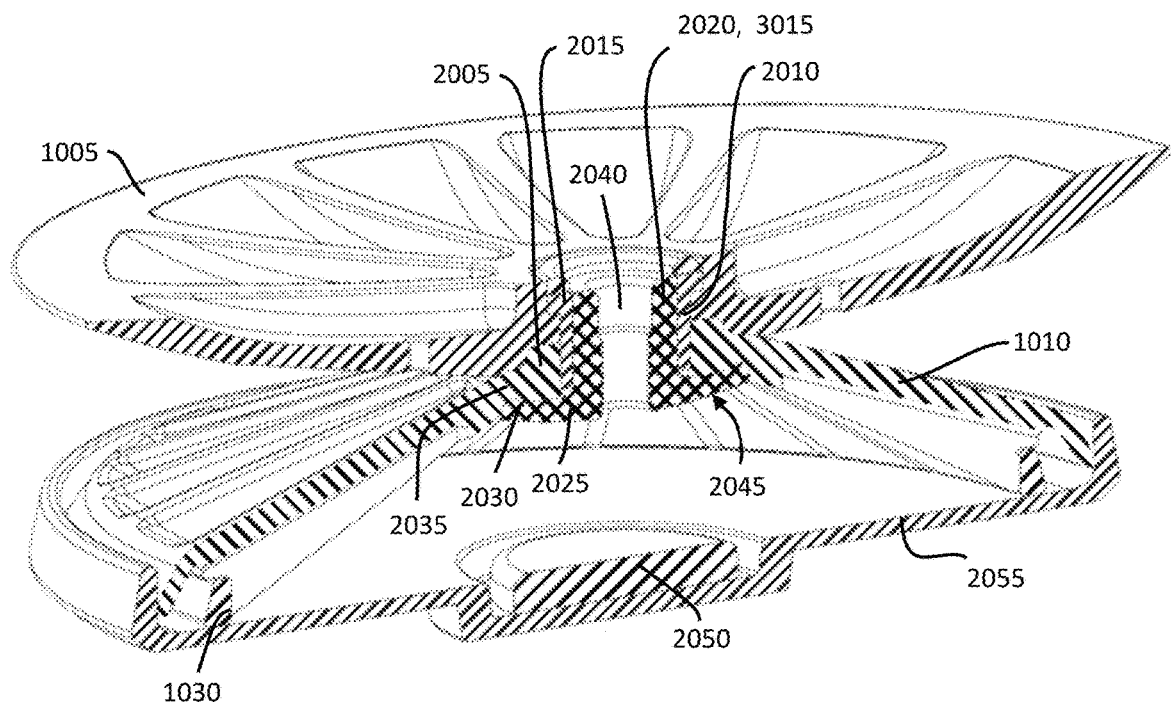
FIG. 2A is an isometric cutaway view of the shoe spring assembly of FIG. 1, showing a through-hole and damper.

In an embodiment shown in FIG. 1, an energy return device, here spring 1000, comprises a flattenable conical disk 1010 assembled with a rigid upper foot-receiving plate 1005 which is rigidly or semi-rigidly attached to the apex 2005 of the aforementioned conical disk 1010. The aforementioned apex 2005 of the conical disk 1010 is shown in FIG. 2A. The springs described in this document are generally considered to be located in the heel of the shoe, so that the foot-receiving plate is a heel-receiving plate, but the inventors anticipate that many of these designs could also be located in other parts of the shoe, such as in the forefoot region of the shoe.

As shown in FIG. 1, the profile of the front-side bottom surface 1015 of the foot-receiving plate 1005 has a different angle relative to a flat bottom surface 1025 of a baseplate on which the conical disk 1010 rests than the profile of the back-side bottom surface 1020 of the aforementioned foot-receiving plate 1005 when the assembly is viewed from the side. In this non-limiting embodiment, the profile of the back-side bottom surface 1020 is closer to horizontal than the front-side bottom surface 1015. This would cause the back of the foot-receiving plate 1005 to bottom out before the front of the aforementioned foot-receiving plate when the foot-receiving plate is displaced downwards. The opposite arrangement may also be used with different effects. The angle of the front and back of the rigid disk may be the same as each other, but different than one or both side angles, again yielding differences in front-to-back or side-to-side stability.

Figure 2B:
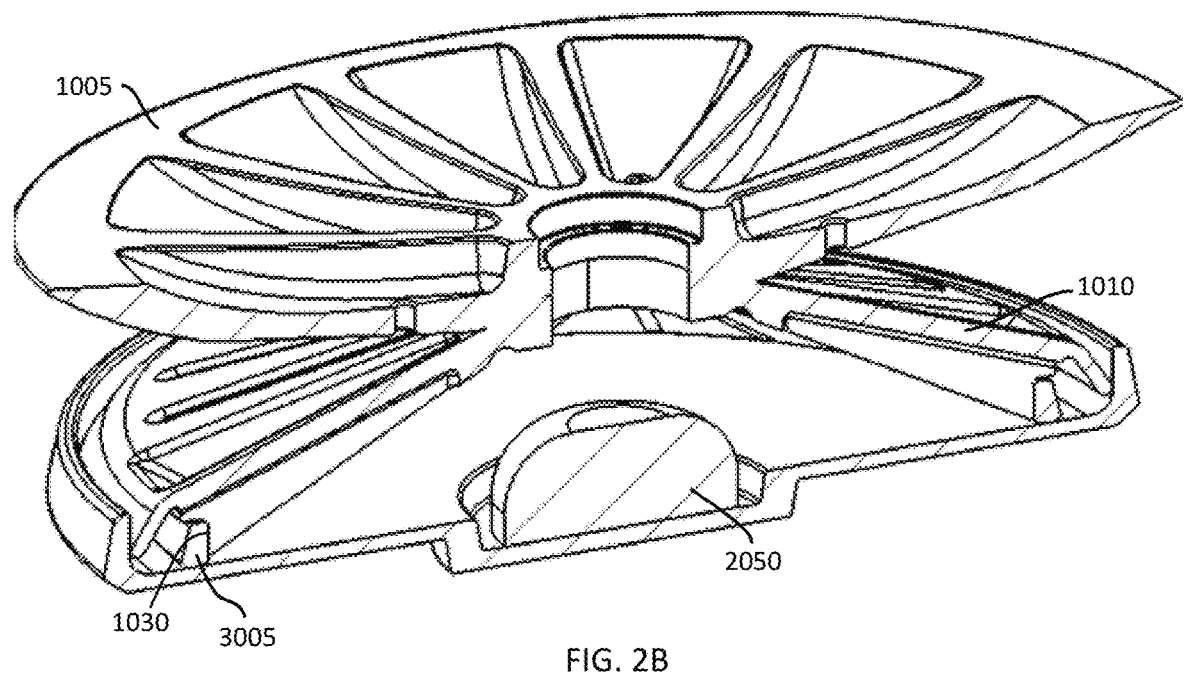
FIG. 2B is an isometric cutaway view of another shoe spring assembly, with a differently shaped damper than the assembly of FIG. 1 and FIG. 2A.

In the cross-sectional view shown in FIG. 2A showing the back cross-sectional of a shoe spring assembly, a rigid upper foot-receiving plate 1005 has a through-hole near the center of the plate and the conical disk 1010 has a through-hole at its apex 2005. In the embodiment shown in FIG. 2A, a bolt or rivet or other fastener passes through the through-hole and is used to rigidly or semi-rigidly attach the upper foot-receiving disk 1005 to the conical disk 1010. The inventors anticipate a variety of different methods of connecting these components, including manufacturing the conical disk 1010 and upper plate 1005 as one piece, as shown in FIG. 2B. Designing the conical disk and rigid upper foot-receiving plate to be two components, as shown in FIG. 2A, may aid manufacturability and allows the use of two different materials, each with discrete properties. For example, a material with higher elongation and lower rigidity may be selected for construction of the conical disk 1010 as compared to the material selected for the rigid upper foot-receiving plate. In a non-limiting embodiment the conical disk 1010 is constructed from polypropylene or a polypropylene blend, and a more rigid material such as, but not limited to, a fiber reinforced nylon, is used for the upper plate 1005.

For reference, as shown in FIG. 2A, the conical disk 1010 has a circular thinner section 2035 located near its apex 2005. The thinner section functions as a live hinge when the conical disk is compressed. By attaching the upper plate 1005 to the conical disk 1010 on the radially inward side of the live hinge, the conical disk 1010 can compress vertically without significant resistance added as a result of the attachment of the foot-receiving plate 1005. At the same time, however, the resilience of the conical disk 1010, and its tendency to remain conical and circumferentially symmetrical during compression, creates a righting effect on the upper plate 1005 which tends to force the aforementioned upper plate 1005 toward parallel alignment with the flat base 1025 of the housing 2055 of the conical disk 1010 from the start of compression through the full compression of the aforementioned conical disk 1010.

This righting effect has been shown, through experimentation, to allow angulation of the upper plate 1005 with an appropriate resistance to angulation during lateral motion of the user or on uneven ground, while also providing an angular stability "righting" effect at all times.

Improved rigidity may be provided by a fastener which acts to clamp the apex, to reduce deformation of the apex itself, in addition to (or instead of) attaching the apex to the upper plate. The conical disk provides resistance to asymmetric deformation (tilting/angling of apex), but the apex itself isn't necessarily very rigid. So clamping the upper plate to the underside of the live-hinge provides extra rigidity by requiring the whole live hinge to deform asymmetrically when the platform tilts, relative to the rigidity of simply connecting the upper platform to the top surface of the apex, because the top of the apex could flex and tilt without causing the live hinge of the conical disk to tilt.

Figure 15:
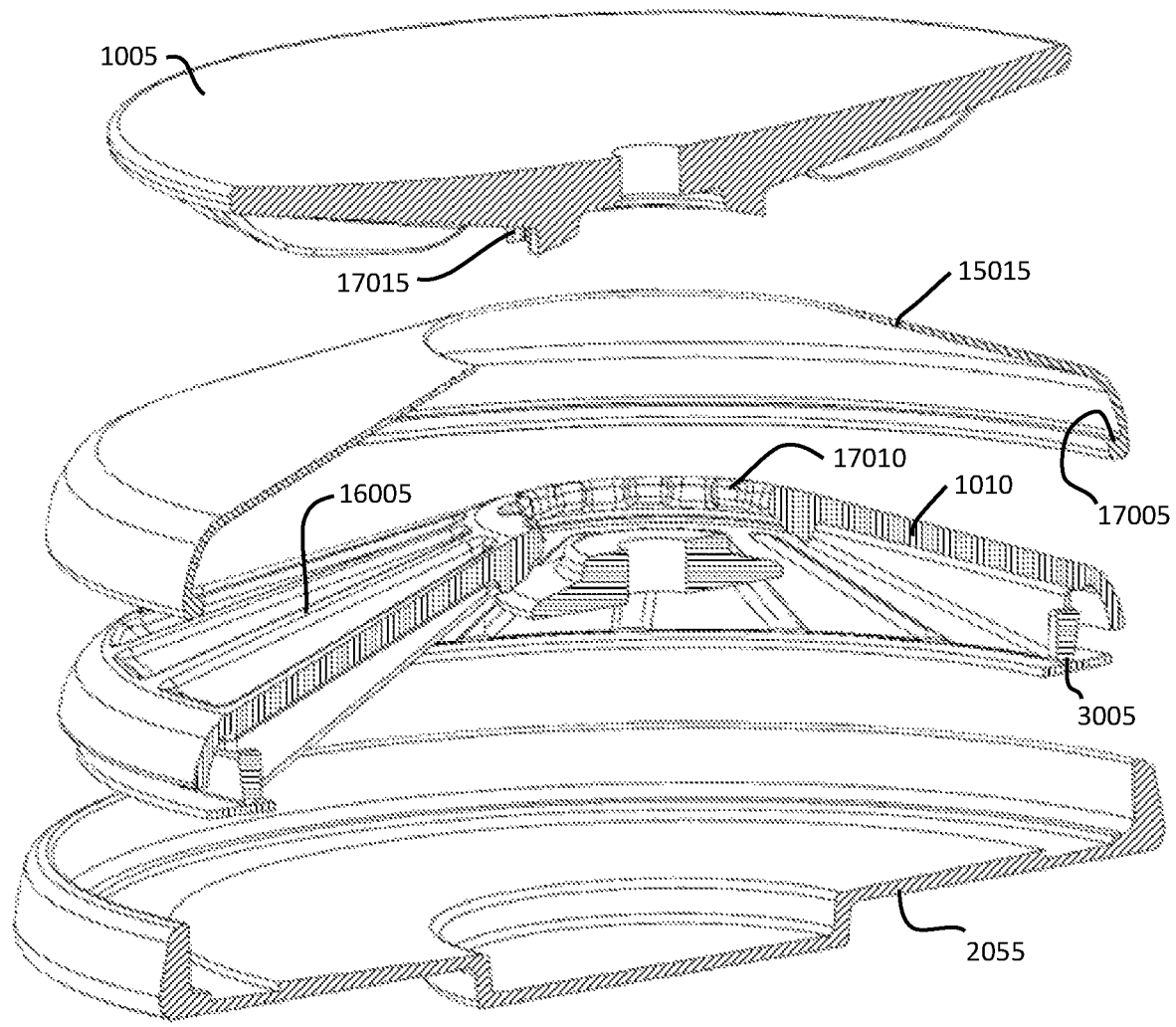
FIG. 15 is an exploded view of the embodiment shown in FIG. 14.

The fastener which attaches the conical disk 1010 to the rigid plate 1005 may be of many different constructions anticipated by the inventors. In the cross-section view shown in FIG. 2A, a nut 2010 and bolt 2020 together forming a fastener 3015 is used. The inventor anticipates that although a threaded engagement between the nut and the bolt may be used, a similar effect may be achieved by using other methods such as adhesives, interference fits, or rivets. The embodiment shown in FIG. 3B uses a rivet 3010 and is anticipated to be a low-cost production option. The rivet forms another example of a fastener 3015. Returning to FIG. 2A, The bolt 2020 is shown with a flange 2025 which may have an upper ring 2030, as shown, that nests inside a tapered section 2035 of the conical disk 1010 near the apex 2005. The flange 2025 located on the bolt 2020 and a corresponding flange 2015 located on the nut 2010 together capture the upper plate 1005 and act to capture and constrain the apex 2005 of the conical disk 1010. Thus, in order for the rigid foot-receiving plate 1005 to pivot relative to the base of the conical disk 1010, the live hinge tapered section 2035 and the rest of the conical disk must deform asymmetrically. The resistance of the live hinge and conical disk to this asymmetric deformation thereby provides additional angular stability to the assembly. Alternatively, the apex 2005 of the conical disk 1010 may also be sandwiched between the upper plate 1005 and the flange 2025 of bolt 2020 in a way that allows it to angulate with less resistance than the live hinge tapered section 2035 of the conical disk 1010, such as by loosely coupling the two together so that the foot-receiving plate 1005 is able to pivot some amount before becoming constrained by the fastener. A resilient member such as a urethane washer may also be used between the upper plate and the conical disk to provide a level of controlled angulation between the components. These configurations, or a combination of them, can be used to set the magnitude of the righting effect. As shown in the embodiment of FIG. 15, the conical disk and the rigid plate have alignment features to rotationally secure the two components together. The apex of the conical disk has spline alignment features 17010 and the base of the rigid plate has a corresponding spline 17015.

In an embodiment, the conical disk may be rotationally asymmetric. The rotational asymmetry may tune the stiffness of the conical disk in different directions. For example, to compensate for a user's foot pronation (foot rolls inwards), the disk could be thicker on one side to provide higher angular stiffness in that direction.

The bolt 2020, or other bottom portion of the fastener 3015, may have a non-flat bottom surface 2045, as shown in FIG. 2A, to interact with a bottom-out damper member 2050 in a progressive manner for a more gradual final bump stop deceleration. Alternatively, the same progressive effect may be achieved by using a damper member 2050 with a non-flat top surface as shown in FIG. 2B.

The fastener 2020 may have a center through-hole 2040 as shown in FIG. 2A.

Conical Ring Spring

Figure 3A:
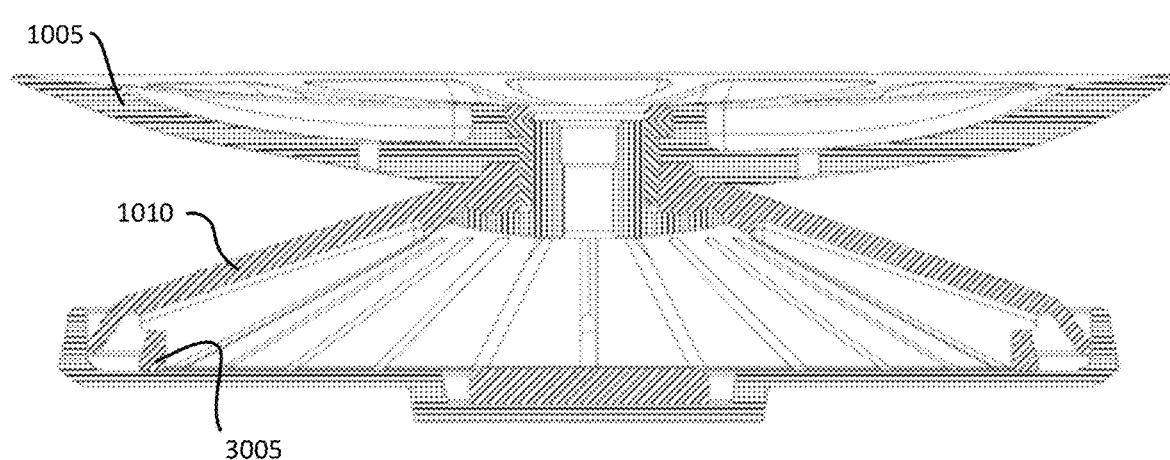
FIG. 3A is a side cutaway view of the assembly of FIG. 2A.
Figure 3B:
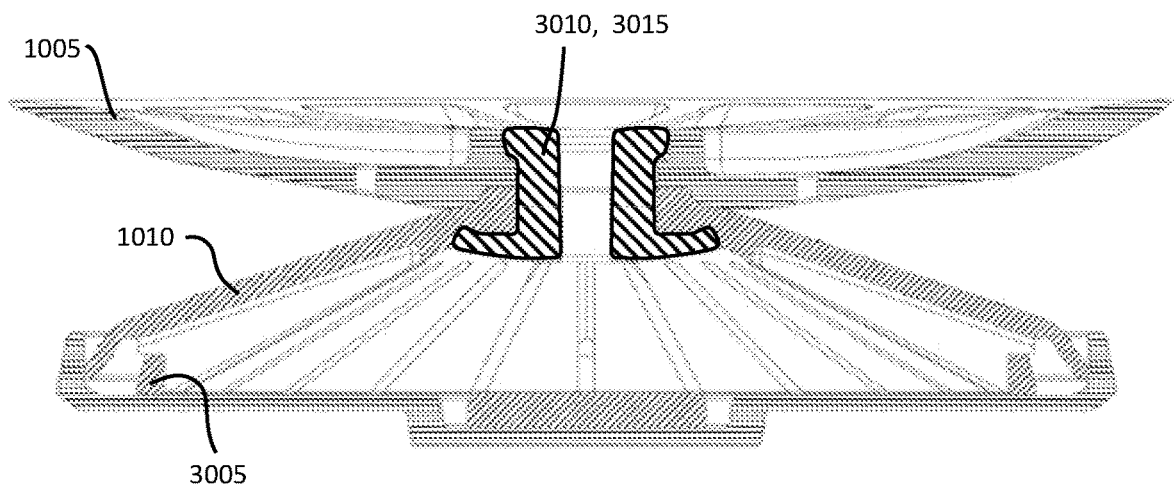
FIG. 3B is a side cutaway view of a shoe spring assembly including a rivet as a fastener.
Figure 4A:
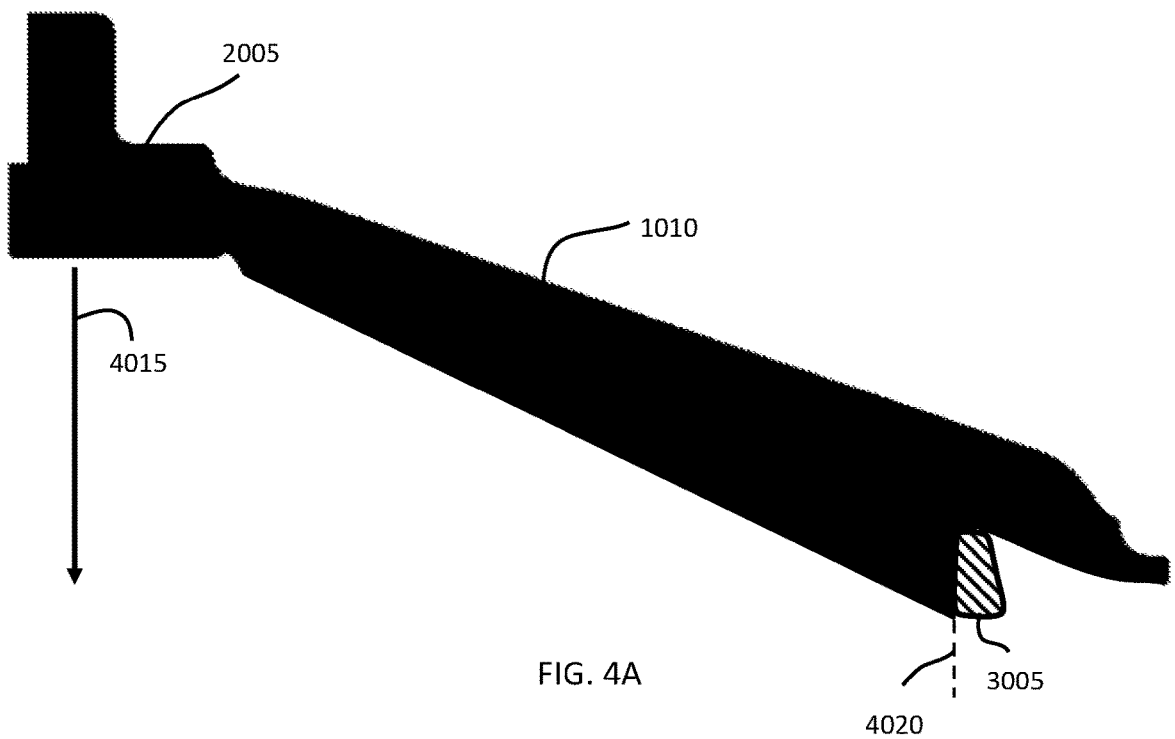
FIG. 4A is a side cross section view of the conical disk and ring spring as present in the assemblies of any of FIGS. 1-3B.
Figure 4B:
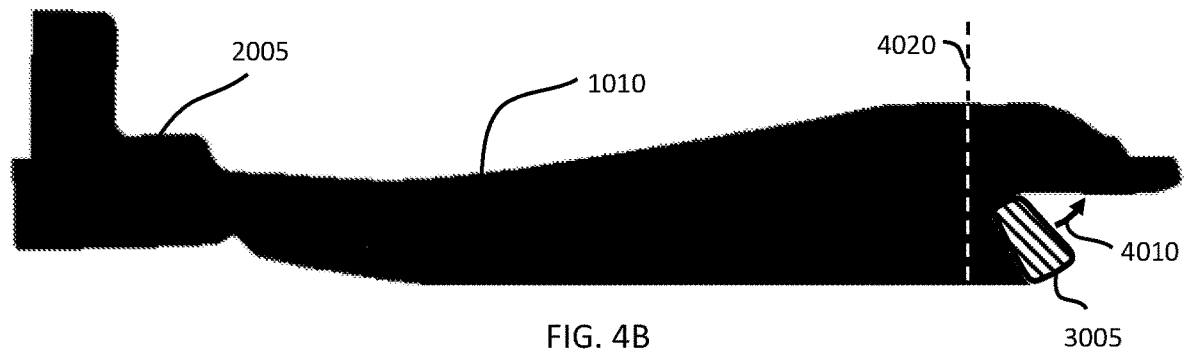
FIG. 4B is a side cross section view of the conical disk and ring spring of FIG. 4A shown in a state of deformation as compressed under a user's heel.

In the cross-section view shown in FIG. 3A, a ring spring 3005 is shown with a conical geometry on at least its outer diameter. That is, instead of a cylindrical shape, the ring spring 3005 has a tapered shape with a thicker cross-sectional area at the bottom than at the top. This conical shape may also be used on the inner diameter of the ring spring or on both its outer and inner diameters. This takes advantage of the flaring and angulation that occurs to the outer diameter of the conical disk 1010 during compression, which pushes outward on the ring spring 3005, so that the thicker part of the ring spring 3005, near the bottom of said ring spring, has a greater effect on the upward spring force of the assembly at the end of the compression travel of the assembly. The profile of the conical ring spring and the conical disk is shown in greater detail in FIG. 4A and FIG. 4B. FIG. 4A shows half of a cross-sectional profile of a conical disk and ring spring in an uncompressed state. The apex 2005 of the conical disk 1010 is shown for reference. FIG. 4B shows an FEA analysis of the same conical disk 1010 and ring spring 3005 during compression. The direction of compression applied to the conical disk is shown by arrow 4015. Arrow 4010 shows the direction of the movement of the ring spring 3005 as the conical disk is compressed. Imaginary line 4020 is shown for reference in FIG. 4A and FIG. 4B to aid the reader in viewing the relative movement of the ring spring as it expands in the radial direction during compression of the conical disk.

Towards the beginning of compression of the conical disk 1010 and ring spring 3005 assembly, the expansion of the ring spring 3005 occurs mostly in the radial direction at the top and bottom of the ring spring 3005. However, as shown in FIG. 4B, as the conical disk 1010 and ring spring 3005 undergo further compression (the direction of compression shown by arrow 4015) the bottom of the ring spring flares outwards relative the opposing axial side at the top of the ring spring 3005.

Because of the angle change of the ring spring 3005 seat from a largely cylindrical shape to a conical shape through the compression of the conical disk 1010, the bottom of the ring spring experiences higher circumferential elongation than the top of the ring spring, especially near the full compression of the conical disk.

The inventors have determined that various spring rate modifications can be made by varying the thickness of the ring spring from top to bottom. If the ring spring is thicker at the bottom, for example, as shown in FIG. 4A and FIG. 4B, then the spring rate can be biased toward being slightly higher near the end of compression as compared to a ring spring with equal thickness from top to bottom.

Figure 5:
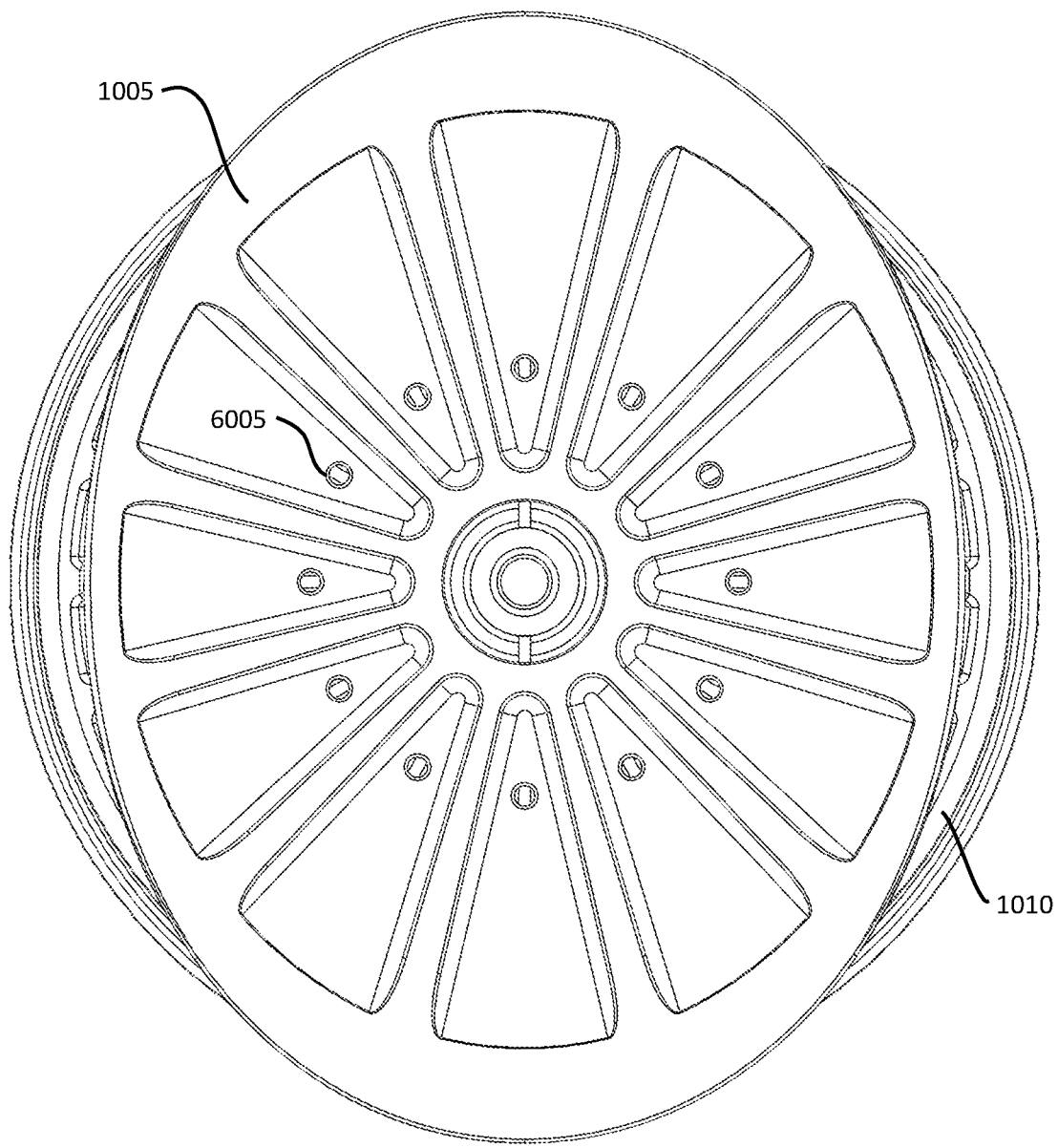
FIG. 5 is a top view of a shoe spring assembly with a non-circular foot receiving plate.

It has also been shown through testing and experimentation that a non-circular upper plate, such as the non-circular upper plate 1005 shown in a top view in FIG. 5, is desirable because the additional front-to-back length of an elliptical or other non-round shape provides a more familiar feel under the foot for the user by allowing the upper plate 1005 to more closely follow the angle of the user's foot. The increased front-to-back length of the upper plate 1005 shown in FIG. 5 provides a greater lever arm for the user's foot to act on the conical disk, causing it to angulate in the front to back directions relative to the user's foot.

Figure 6:
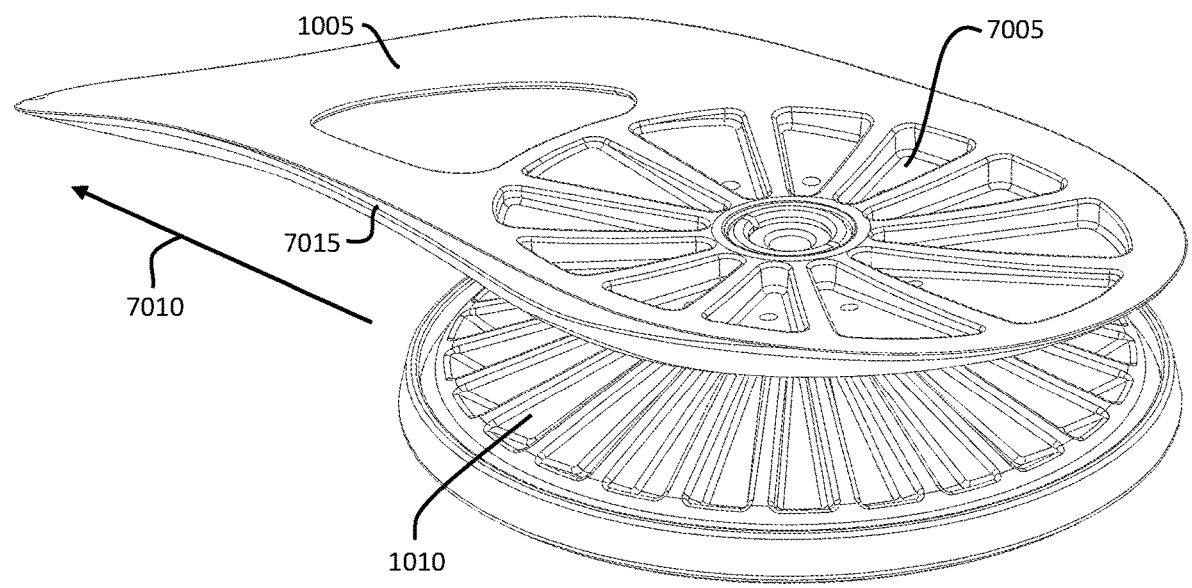
FIG. 6 is an isometric view of a shoe spring assembly having a foot-receiving plate with a non-round shape.
Figure 7:
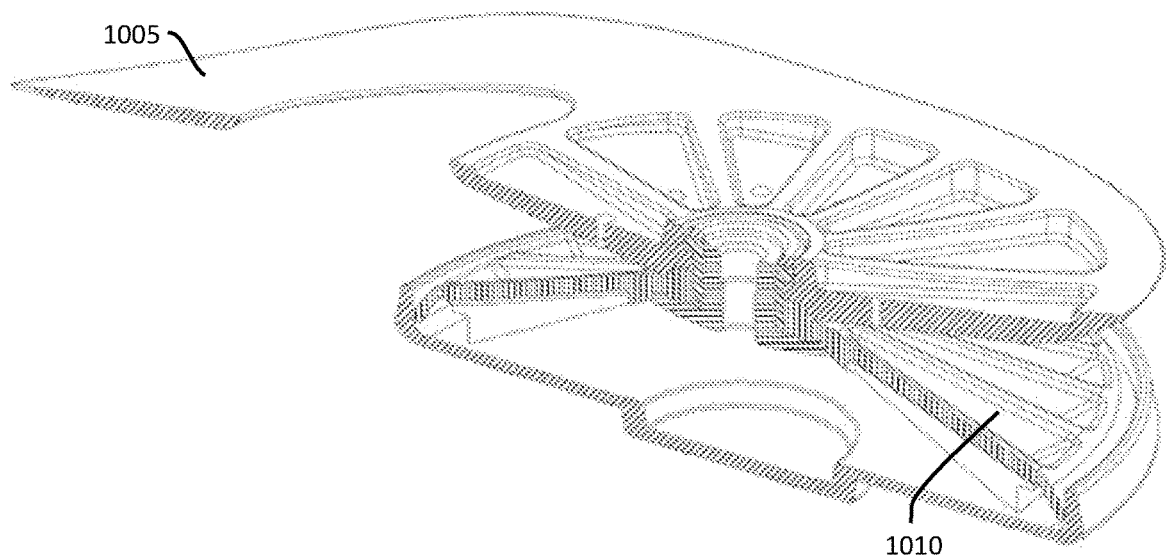
FIG. 7 is a cutaway view of the shoe spring assembly of FIG. 6.
Figure 8:
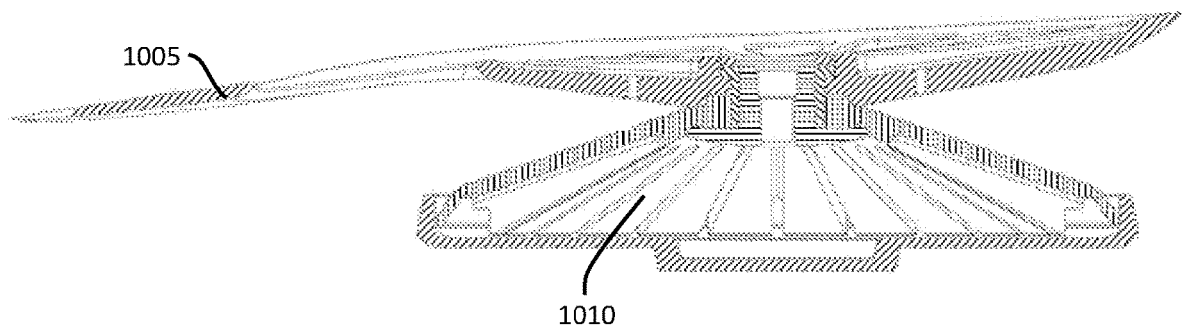
FIG. 8 is a side cutaway view of the shoe spring assembly of FIG. 6.
Figure 9:
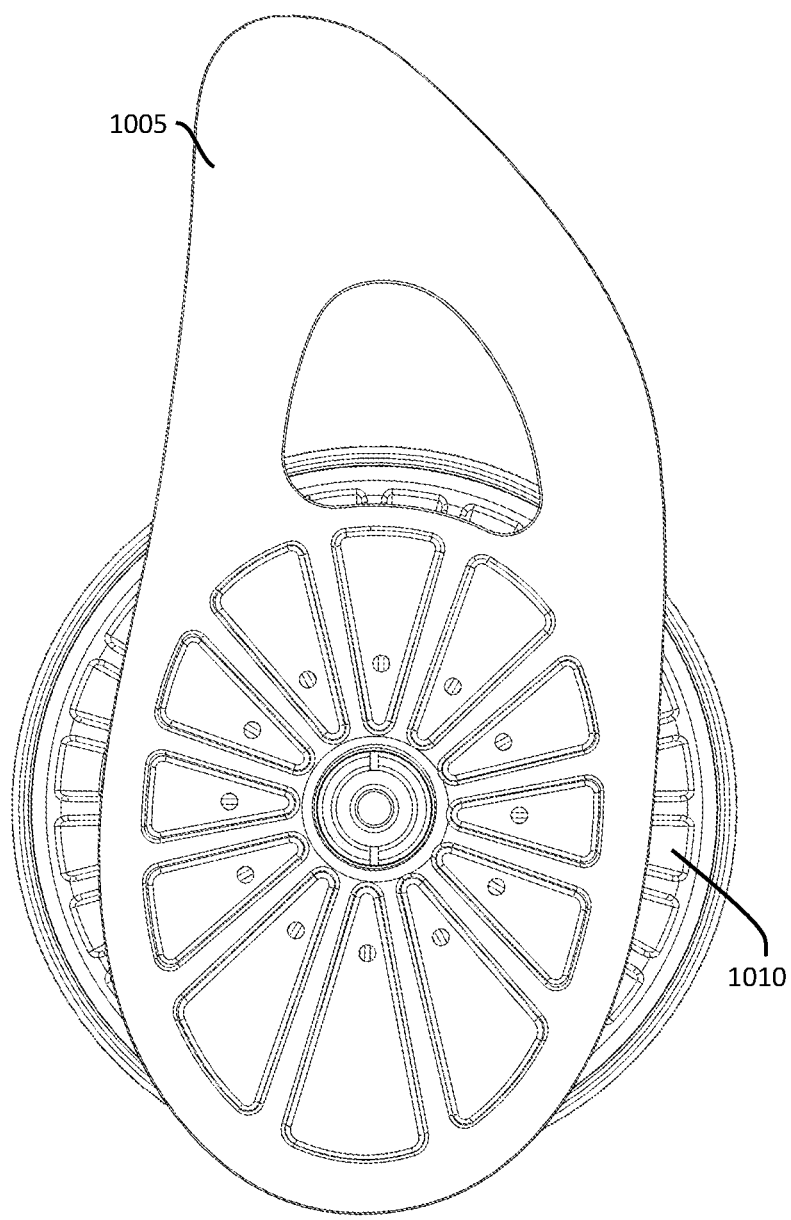
FIG. 9 is a top view of a shoe spring assembly having an elongated foot-receiving plate.

In an embodiment shown in FIG. 6, the non-round shape of the rigid foot-receiving plate 1005 may be long enough in the forward direction, the forward direction shown by arrow 7010, and appropriately shaped to provide a level of arch support as shown in FIG. 6, FIG. 7, FIG. 8, and FIG. 9. Arch support region 7015 is shown for reference in the embodiment in FIG. 6. Through testing the inventors have shown that it is preferable for the arch support to move in unity with the rigid foot-receiving plate.

In the embodiment shown in FIG. 6, the rigid upper plate 1005 has a plurality of pockets 7005. These pockets allow mechanical interaction with protrusions in the lower surface of the footwear upper to locate the rigid plate relative to the footwear upper. These pockets may be of any shape that captures the protrusions.

Lateral Vs Front-to-Back Stability

The inventors have determined, through testing and experimentation, that low resistance to angulation of the upper plate, relative to the base of the conical disk, at all times during compression of the conical disk and at full compression of the conical disk is undesirable for some users in some applications. During testing, some users indicated that lateral angulation of the upper plate led to an undesirable sensation of foot instability tilting in the direction to the left and or right of the user's foot.

Figure 10:
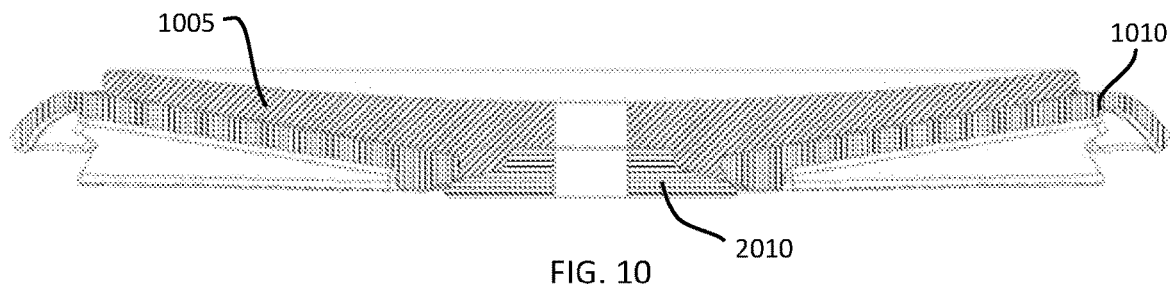
FIG. 10 is a side cutaway view of a shoe spring assembly as compressed under a user's heel.

To solve this issue, the inventors have developed a new shape of the upper plate lower surface which allows higher or different relative angular motion of the disk and upper plate from back to front (such as during the initial foot contact) while reducing or preventing side to side angular motion at full compression. The inventors observed during testing that some users indicated that they preferred to feel more solidly connected to the ground under the shoe particularly when the shoe was at full compression. From the perspective shown in FIG. 10 which shows the rear cross-sectional view of the assembly, it may be seen that the contact, or near contact, of the upper plate and the compressed conical disk will resist angulation of the upper plate relative to the conical disk in which the upper plate tilt in a direction generally to the left or right of the foot.

When compressed, the right and left areas on the bottom of the upper plate are contacting or nearly contacting surfaces on the upper faces of the conical disk.

Figure 12:
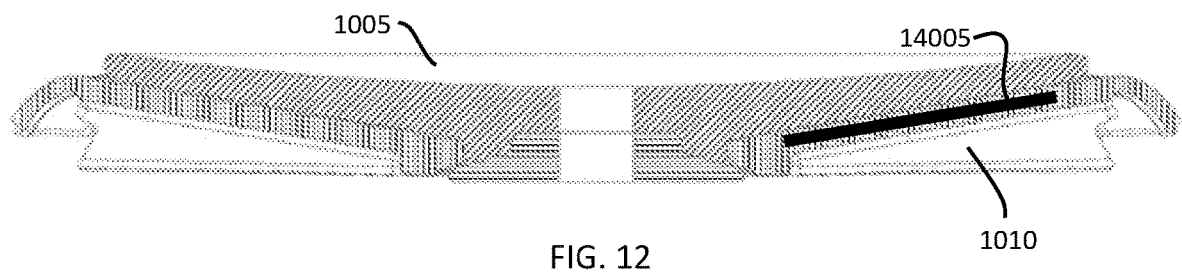
FIG. 12 is a side-cutaway view of a shoe spring assembly as compressed under a user's heel and also having an elastic damper compressed between the conical disk and the foot-receiving plate.

Shown in FIG. 12 is a simplified rear-view cross section of a partial assembly of a conical disk 1010, flanged nut fastener member 2010, and upper plate 1005, wherein the contact or near contact of the upper plate 1005 with the compressed conical disk 1010 is visible. It is understood and anticipated by the inventors that this contact or near contact may or may not include one or more layers of material between the upper plate and the conical disk such as but not limited to foam or elastomeric material that can be used for additional damping. A visco-elastic damper 14005 made from material such as foam or an elastomer can be used anywhere between these surfaces, as shown schematically in FIG. 12 between the lower surface of the rigid foot-receiving plate and the upper surface of a conical disk, to provide damping as the assembly compresses. A foam or deformable elastomer damper can also be used between these surfaces as a way to vary the angular stability when fully compressed or as the disk reaches full compression.

The inventors have observed that the effect of this contact or near contact between the upper plate 1005 and the upper surface of conical disk 1010 of the spring assembly (which may include one or more intermediary damper elements) which limit foot angulation in the foot inversion and eversion angles at or near full compression of the spring assembly results in a grounded sensation felt by the user.

Figure 11:
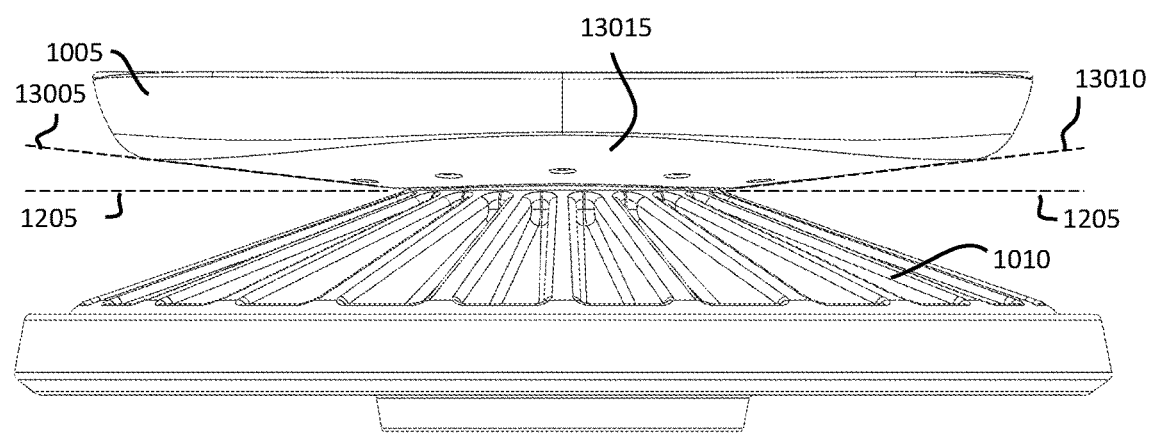
FIG. 11 is a back view of a shoe spring assembly showing relative orientations of portions of a bottom surface of the foot-receiving plate.

In the rear view of the shoe spring assembly shown in FIG. 11, the angle of the profile of the bottom surface relative to the reference plane 1205 on the left and right sides of the downward-facing surface of the upper plate 1005 is shown to be symmetrical for stability as shown by reference lines 13005 and 13010. However, the rear surface 13015 of the rigid foot-receiving plate is less flat in comparison, allowing the aforementioned rigid foot-receiving plate to pivot in the forward and backward direction relative to the foot, that is, in the direction which would allow the foot of a user to move in plantar flexion or dorsiflexion respectively.

Figure 13:
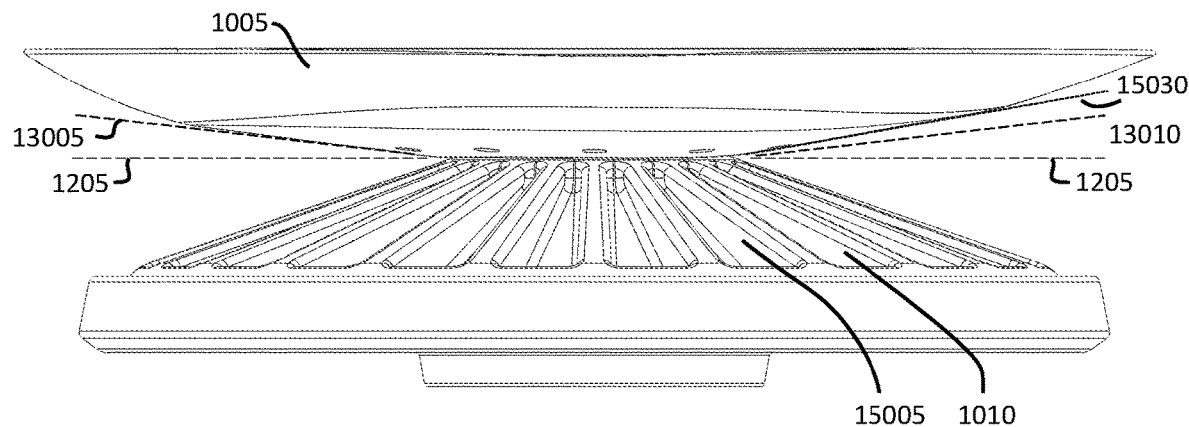
FIG. 13 is a side view of a shoe spring assembly showing relative orientations, different from the embodiment of FIG. 11, of portions of a bottom surface of the foot-receiving plate.

As shown in the side profile view of FIG. 13, the angle of the rearward portion of the bottom of the upper plate, which is on the right hand side and is shown by foot-receiving plate rear surface reference line 15030, has a high enough angle that it does not contact the upper surface of the conical disk at full compression when the upper plate is parallel to the base of the conical disk. This allows the upper plate to rock backward such as is desirable during the initial heel contact with the ground in a heel strike motion.

Note in the device in FIG. 13, the angle of the front of the bottom of the upper plate, which is on the left hand side, is similar to the angle from side to side. This may or may not be desirable for a given shoe and user. The inventors anticipate using a greater angle on the front for some applications.

Damping Embodiment

The energy return footwear device disclosed by the inventor in a prior document in U.S. Pat. No. 9,500,245 disclosed the usefulness of a compression biased damper. The purpose of this damper is to provide additional resistance to compression toward the end of the conical disk compression to make up for a reduction in spring force a toward the end of the travel.

The challenge has been to achieve a high enough damper resistance during compression with a configuration characterized by lightweight, low cost, and simple construction. To achieve this, it may be beneficial to integrate one or more components made of a material with high viscoelasticity and to deform this material in such a way to cause a high level of deformation during the last portion of the conical disk compression.

The embodiment shown in FIG. 14, FIG. 15, FIG. 16, and FIG. 17 and provides a new approach to addressing this challenge by using a viscoelastic material loaded in tension rather than compression, and taking advantage of a new geometry which causes and allows a large volume of the viscoelastic component to undergo high displacement for at least a portion of the conical disk compression.

Figure 20:
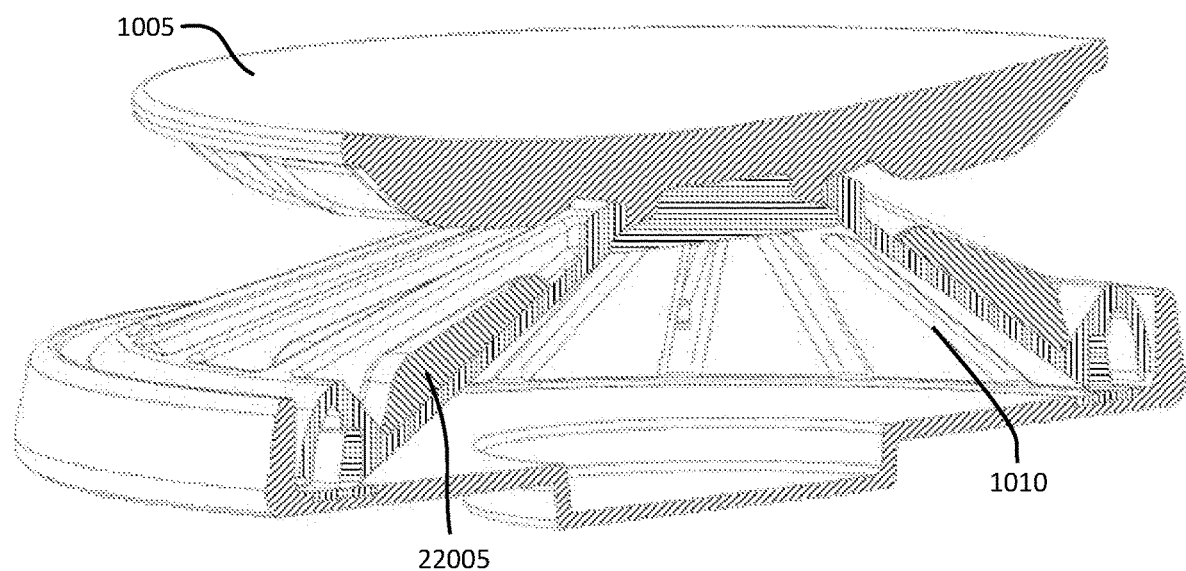
FIG. 20 is an isometric cutaway view of a shoe spring assembly having protrusions on the underside of a foot-receiving plate which interact with pockets in a conical disk as the assembly is compressed under a user's heel, the pockets including viscoelastic material inserts.

In the cross-section views shown for example in FIG. 1 though FIG. 20, the conical disk 1010 is configured with pockets 15005 in the upper surface of the aforementioned conical disk 1010, rather than the slot-like features previously disclosed by the inventor in U.S. Pat. No. 8,707,582. The pockets 15005 shown in the embodiment in FIG. 13 are larger than the slots disclosed in U.S. Pat. No. 8,707,582.

Figure 27:
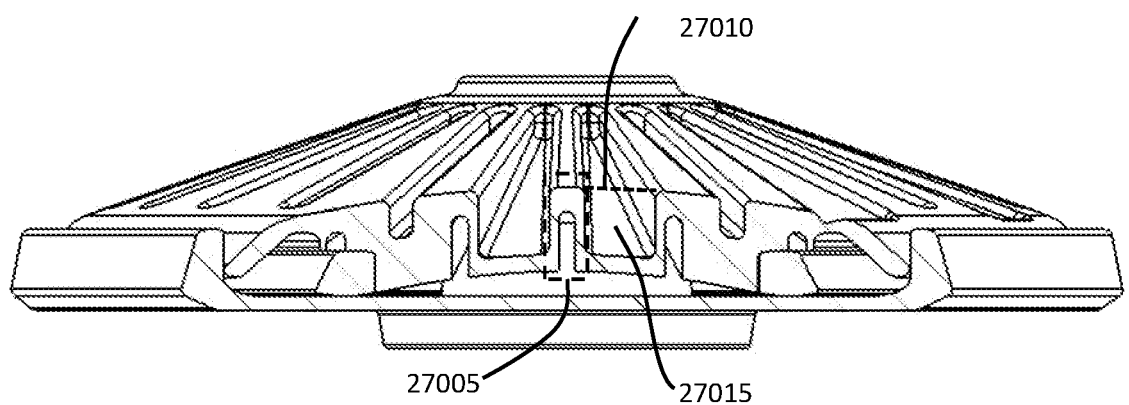
FIG. 27 is a side cutaway view of an exemplary conical disk showing cross sectional areas of walls and pockets.

In contrast to the parallel walls of the slots along the surface of conical disk disclosed in the aforementioned prior art in U.S. Pat. No. 8,707,582, in the embodiment of the conical spring shown in FIG. 13, the walls of the pockets 15005 have a triangular profile when viewed from the top. As shown in FIG. 27, the radially outer-most ends of the pockets 15005 have a smaller cross-section of material between the pockets, the cross-section shown within dashed box 27005 for reference, compared to the cross-sectional area within the trough of the voids within the pockets, the cross-section area 27015 enclosed by imaginary line 27010 for reference. This may be true for all or some of the pockets.

Figure 14:
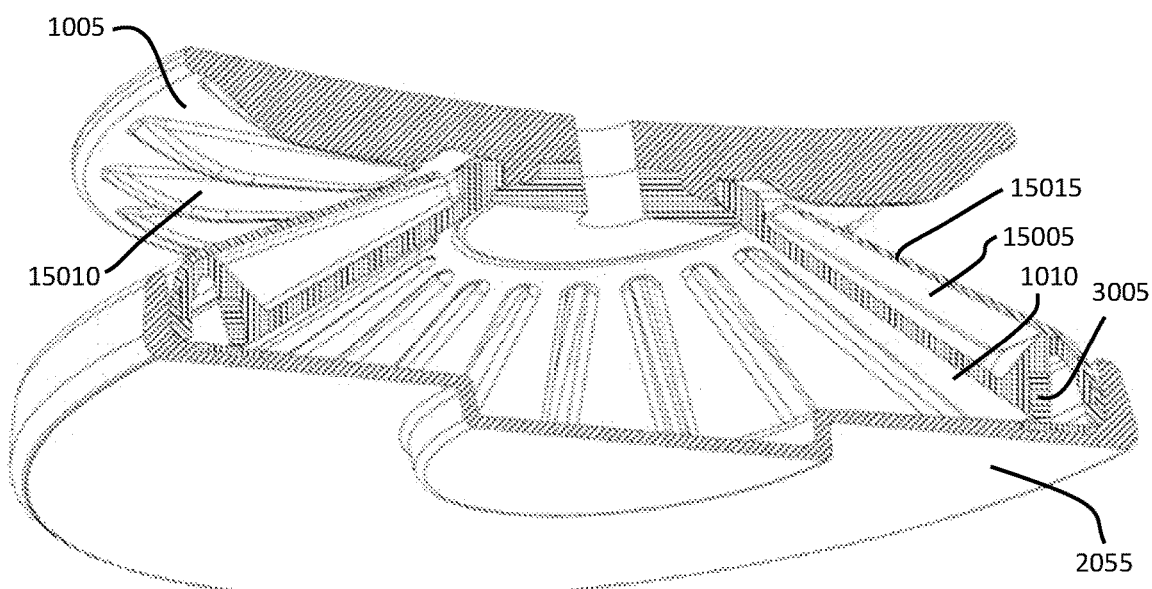
FIG. 14 is an isometric cutaway view of a shoe spring assembly having protrusions on the underside of a foot-receiving plate which interact with pockets in a conical disk as the assembly is compressed under a user's heel.
Figure 16:
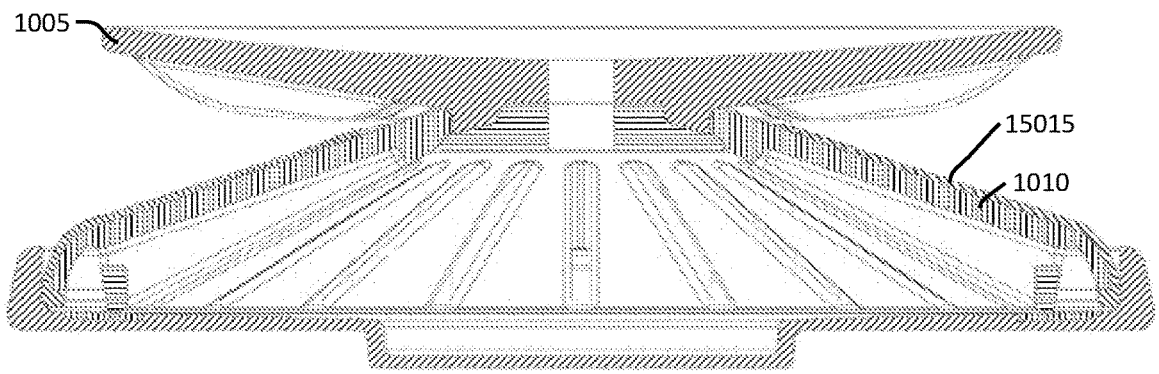
FIG. 16 is a side cutaway view of the embodiment shown in FIG. 14.

This reduces the amount of material in the conical disk, resulting in reduced resistance to compression. The conical disk is preferably made from a material with high durability to bending forces, such as polypropylene. During rebound the conical disk 1010, shown in FIG. 14, returns a lesser portion of the energy it stored during compression compared to the ring spring 3005, which is not subjected to the same high strain rates of the conical disk 1010 and may be made from a different material such as Delrin. Thus, reducing the compression force of the conical disk 1010 allows more energy to be stored in the ring spring 3005 than the conical disk 1010 for the same compression force. The inventor has determined through testing that allowing more of the spring force to come from the ring spring 3005 results in higher overall energy return efficiency of the conical disk/ring spring assembly. Additionally, as shown in FIG. 14, the pockets 15005 are large enough to receive, without interference, the protrusions 15010 on the lower surface of the rigid upper foot-receiving plate 1005 when the conical disk 1010 is flattened. An alternate side profile view is shown in FIG. 16.

A thin conical damper disk 15015, comprised of viscoelastic material is secured around the outer diameter of the conical disk 1010, to prevent the outermost edges 17005 of said viscoelastic disk 15015 from pulling inward. The outermost outer diameter 17005 of the viscoelastic material can also be used as an air seal against the conical disk housing 2055, as shown in FIG. 14. The viscoelastic disk 15015 circumferentially bridges the gaps between the ribs 16005 which form the sides of the pockets 15005 in the top of the conical disk 1010, the aforementioned ribs are shown in an exploded view in FIG. 15 for reference.

Figure 17:
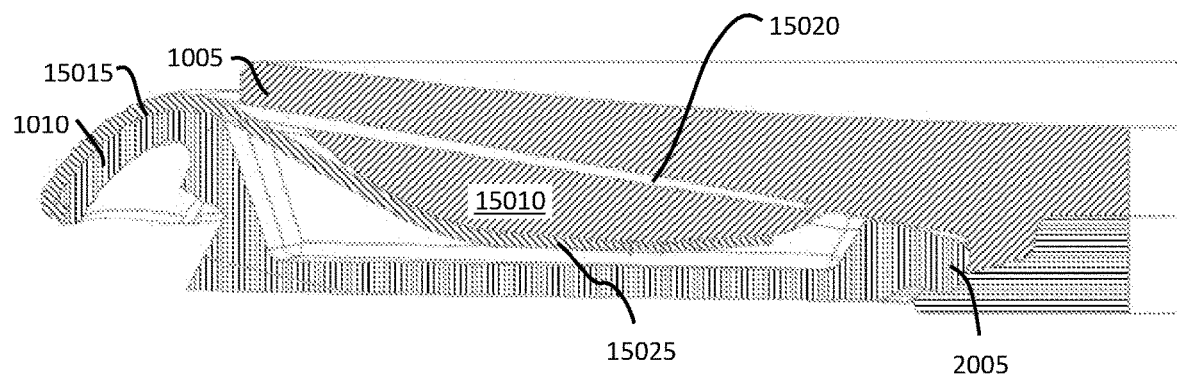
FIG. 17 is a closeup side cutaway view of the embodiment shown in FIG. 14, where the assembly is compressed as under a user's heel.

As shown in FIG. 17, when the upper plate 1005 is displaced downwards and the conical disk 1010 compresses and flattens, the downward protrusions 15010 on the lower surface of the upper plate 1005 contact the top of the viscoelastic damper disk 15015 and push it into the pockets 15005 between the ribs 16005. In doing so, the viscoelastic disk 15015 is deformed from a smooth conical shape, into a circumferentially wavy shape. The elongation of this material is significant, as is the volume of material that can be elastically stretched in this way. In FIG. 17 the damper disk 15015 is shown, schematically, in a straight, uncompressed state by line drawing 15020 and is shown in a bent, compressed state by line drawing 15025. The apex 2005 of the conical disk is shown for clarification. As can be seen in FIG. 16 and FIG. 17, the downward protrusions 15010 may be vertically longer away from the apex.

Figure 18:
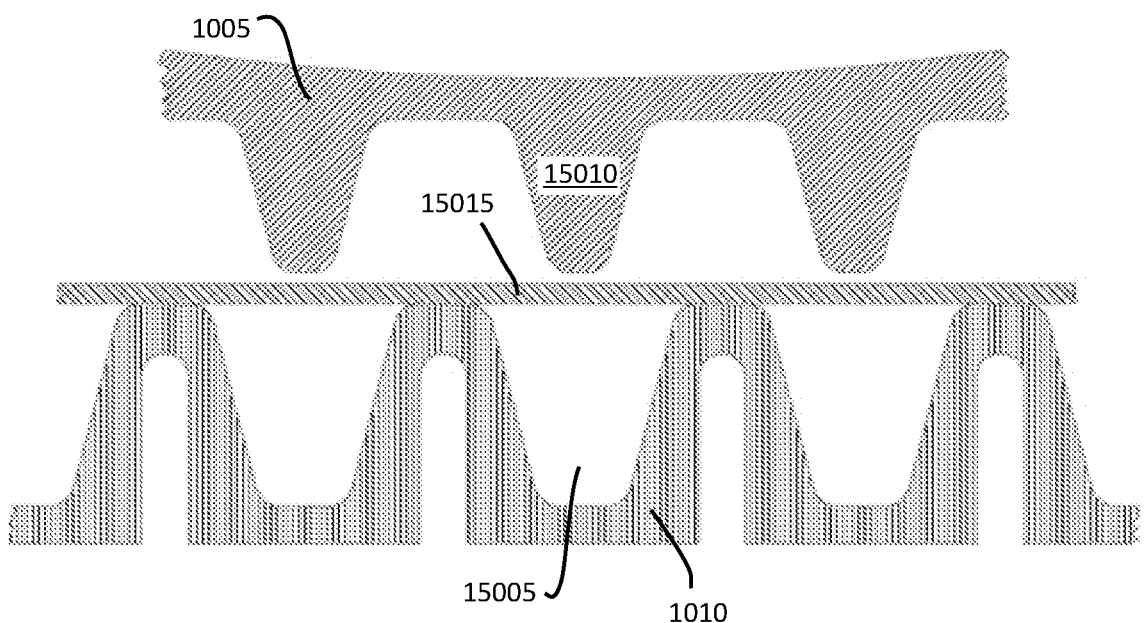
FIG. 18 is a schematic view of the relationship between the protrusions, pockets, and a damper disk of the embodiment shown in FIG. 14, prior to compression.

In the schematic circumferential cross-section view shown in FIG. 18 of a portion of the upper plate 1005, viscoelastic conical disk 15015, and conical disk 1010, the assembly is in its at-rest (uncompressed) position.

Figure 19:
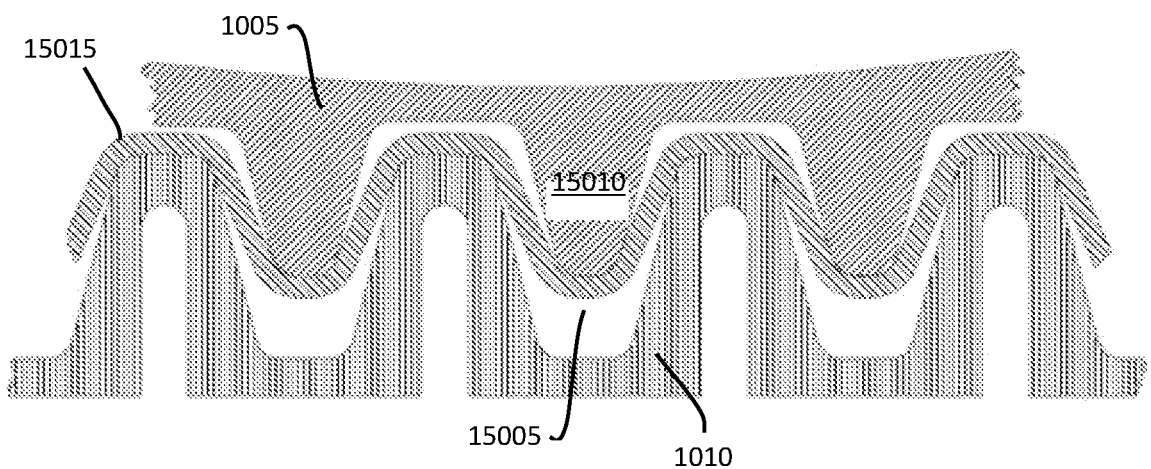
FIG. 19 is a schematic view of the relationship between the protrusions, pockets, and damper disk of the embodiment shown in FIG. 14, when compressed.

As shown in FIG. 19, the assembly is fully compressed, with the protrusions on the underside of the rigid upper plate 1005 protruding into the conical disk 1010 pockets 15005 and stretching the viscoelastic conical damper disk 15015 in a wave pattern. The damping disk also has the benefit of providing a stabilizing effect to the conical disk which starts when the protrusions 1005 of the upper plate 1005 interface with the damper disk 15015, which occurs at a position of the shoe spring assembly's travel before the upper plate bottoms out against the top surface of the conical disk.

The result is a damping element that can provide a high level of energy dissipation with a lightweight and compact form factor.

The conical disk 1010 and upper plate 1005 may have a spline interface (or some other suitable rotation angular timing geometry), as shown in FIG. 15 to set and maintain an angle between the two parts to avoid interference of the protrusions with the pockets.

In an embodiment shown in FIG. 20, one or more of the pockets in the upward facing surface of the flattenable conical disk have a compressible and/or deformable viscoelastic material insert 22005. The inserts may be individual or connected. When the assembly is compressed, the downward facing projections on the lower surface of the foot-receiving plate, contact the inserts and deform and/or compress them. In such embodiments, the viscoelastic element or elements are loaded in compression, rather than in tension.

The viscoelasticity of the insert material dissipates energy to reduce the rate of contact between the lower surface of the upper plate and the upper surface of the conical disk as the flattenable conical disk nears full compression. Compression of a portion of the insert that occurs to the beginning of compression can also increase angular stability during compression if that is desirable for some footwear types.

There are many different materials that can be used for these inserts such as, but not limited to Poron, sorbothane, or D30 non-newtonian polymer. A suitable material will provide greater resistance to compression and/or deformation with higher speed compression/deformation and with lower energy return after compression/deformation.

Figure 21:
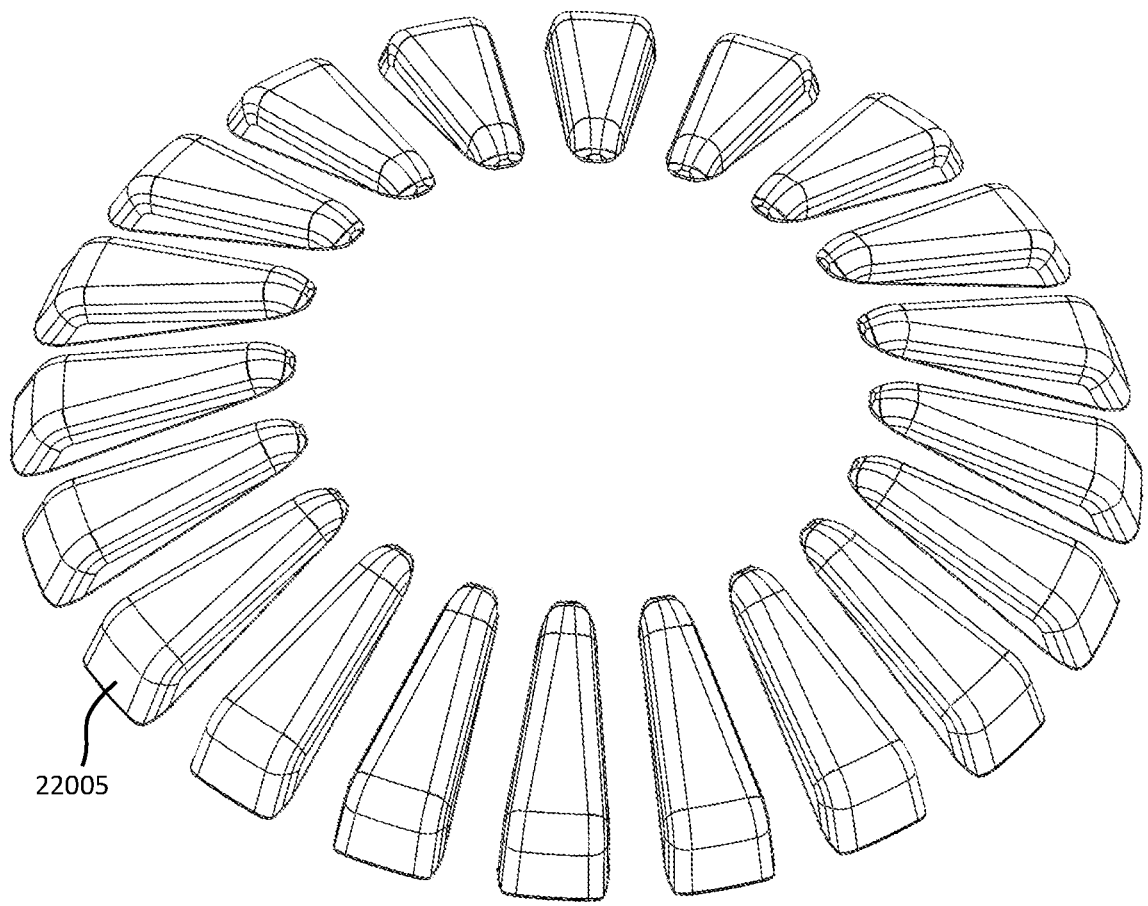
FIG. 21 is an isometric view of an array of inserts for the shoe spring assembly shown in FIG. 20.

The array of inserts 22005 from the embodiment shown in FIG. 20 is shown in FIG. 21 without the rest of the assembly. All of the pockets in the upper surface of the conical disk may be filled or only some of them may be filled. Different sizes or strengths of foam can be used from side to side and from front to back of the disk with various effects.

Figure 22:
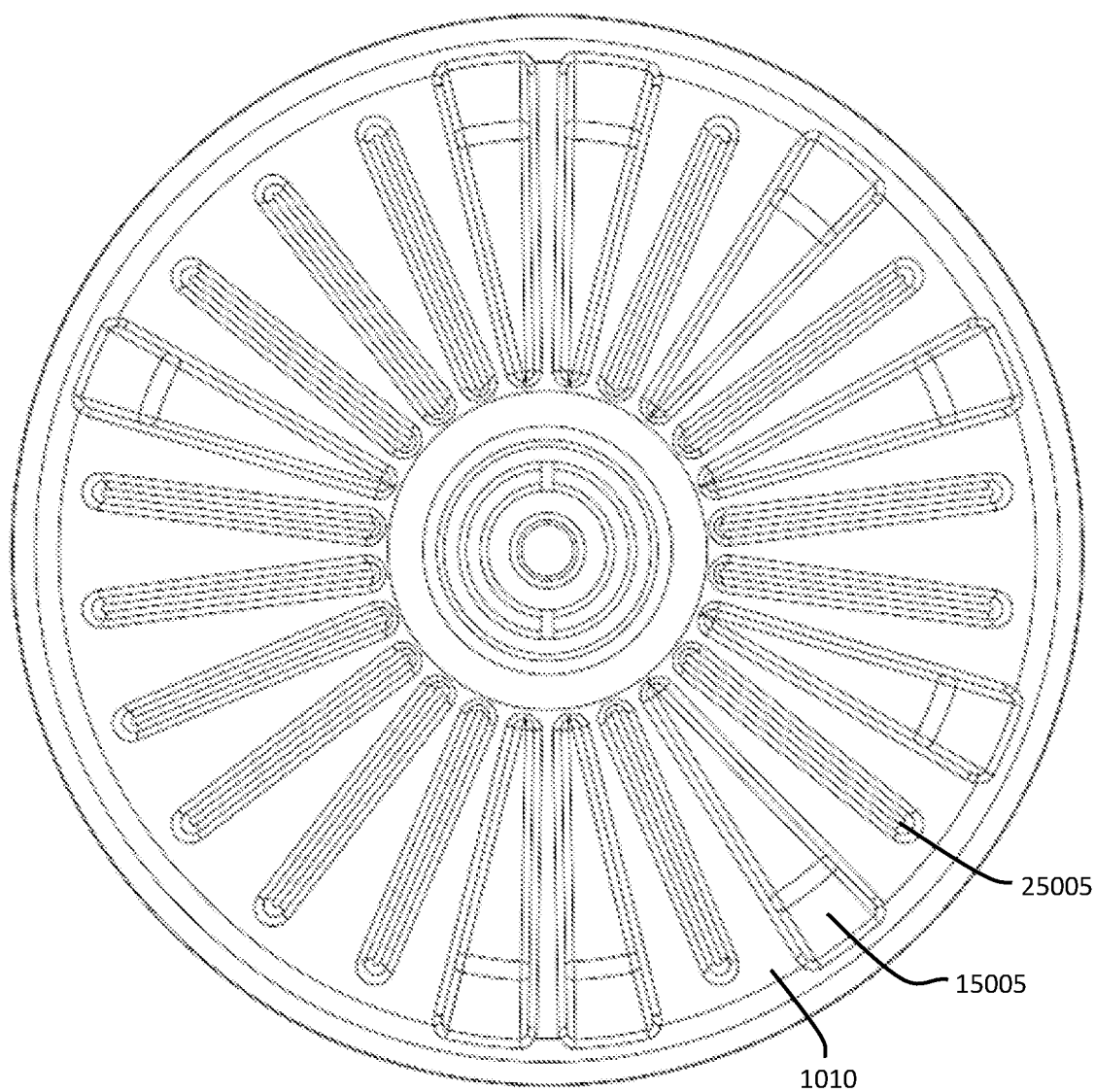
FIG. 22 is a top view of a conical disk for a shoe spring assembly, the conical disk having an upper surface with some relatively thin slots and some relatively wide pockets.
Figure 23:
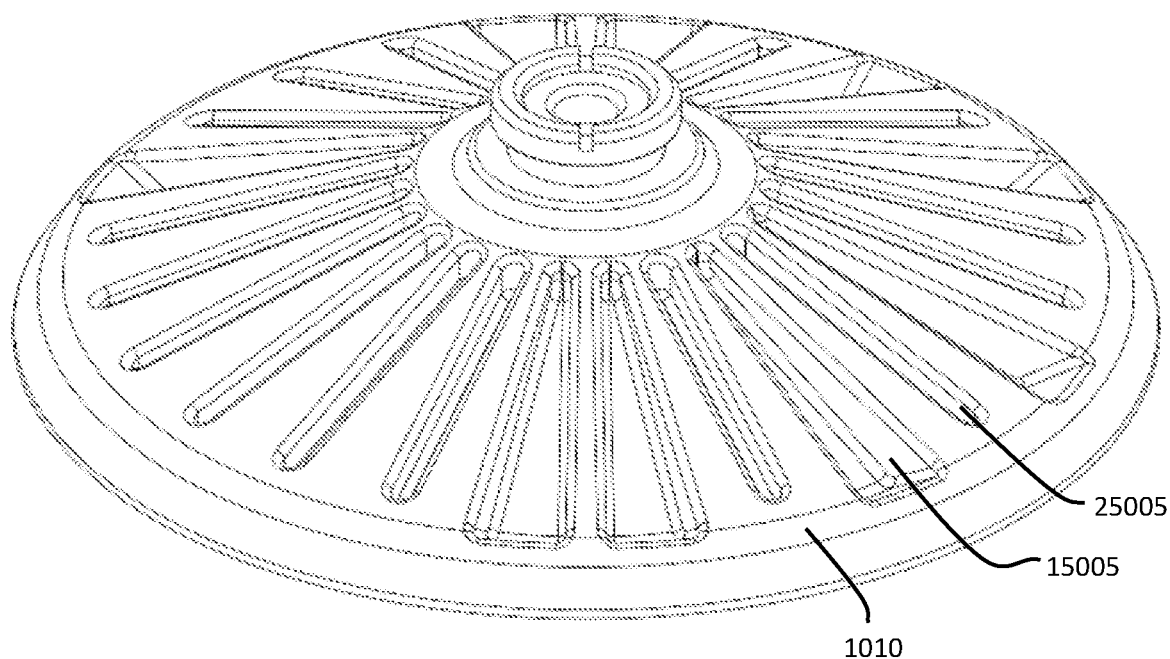
FIG. 23 is an isometric view of the conical disk shown in FIG. 22.

In the embodiment shown in FIG. 22, the conical disk 1010 has a plurality of indented trough-like features extending outwards in the radial direction which are designed to reduce the conical disk's resistance to compression, thereby allowing the conical disk to contribute less of the spring force of the assembly, dissipate less energy as heat due to deformation of the conical disk, and thereby store a greater proportion of energy in the ring spring. The slot-like features disclosed in U.S. Pat. No. 8,707,582 result in more material in the conical disk than the pockets 15005 disclosed in this document and thus greater stiffness to tilting of the rigid foot-receiving plate 1005. The reduced stiffness introduced by the pocket geometry is counteracted by the fastener concept and other angular stability-increasing concepts disclosed in this document, enabling the use of the pocket geometry and resulting in a corresponding increase in energy-return efficiency. However, in some embodiments it may be desirable to increase the angular stability of the conical disk still, while minimally affecting energy return efficiency. In the embodiment shown in FIG. 22 through FIG. 26, a conical disk 1010 has a combination of slots 25005 and pockets 15005. In this embodiment, the conical disk has been designed to accommodate the angular stability needs of a user right foot which is suffering from overpronation. As viewed from the perspective shown in FIG. 22, by adding slots on the left and right side of the conical disk 1010, the inventor has increased the rigidity of the conical disk against deforming and tilting in the direction to the left and right of the user's foot. By increasing the number of slots, as compared to the number of pockets, on the left half of the conical disk 1010, the inventor is able to counter the user's right foot's tendency to pronate, rolling inward. The inventors anticipate that, in a similar way, the conical disk may be designed to have varying concentrations of slots and pockets along its circumference. This is one way to obtain rotational asymmetry of the conical disk. The rotational asymmetry may be selected in order to tune the angular rigidity of the conical disk in different directions and thereby meet a wide variety of user's needs while maintaining improved energy return efficiency compared to a conical disk having only symmetrical slot geometry.

Figure 24:
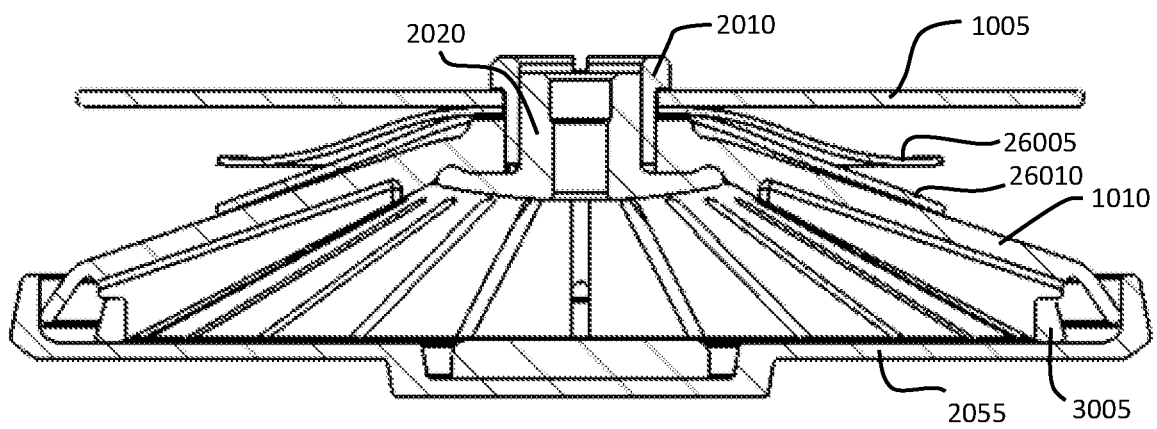
FIG. 24 is a side cutaway view of a shoe spring assembly including a conical disk as shown in FIG. 22 and including a stabilizing spring, damper, and foot-receiving plate.
Figure 25:
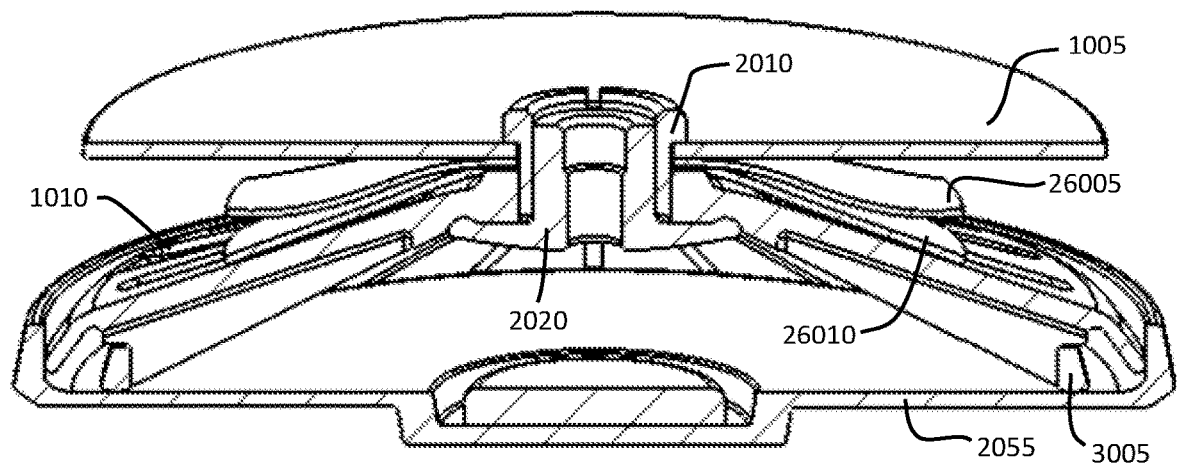
FIG. 25 is an isometric cutaway view of the shoe spring assembly shown in FIG. 24.
Figure 26:
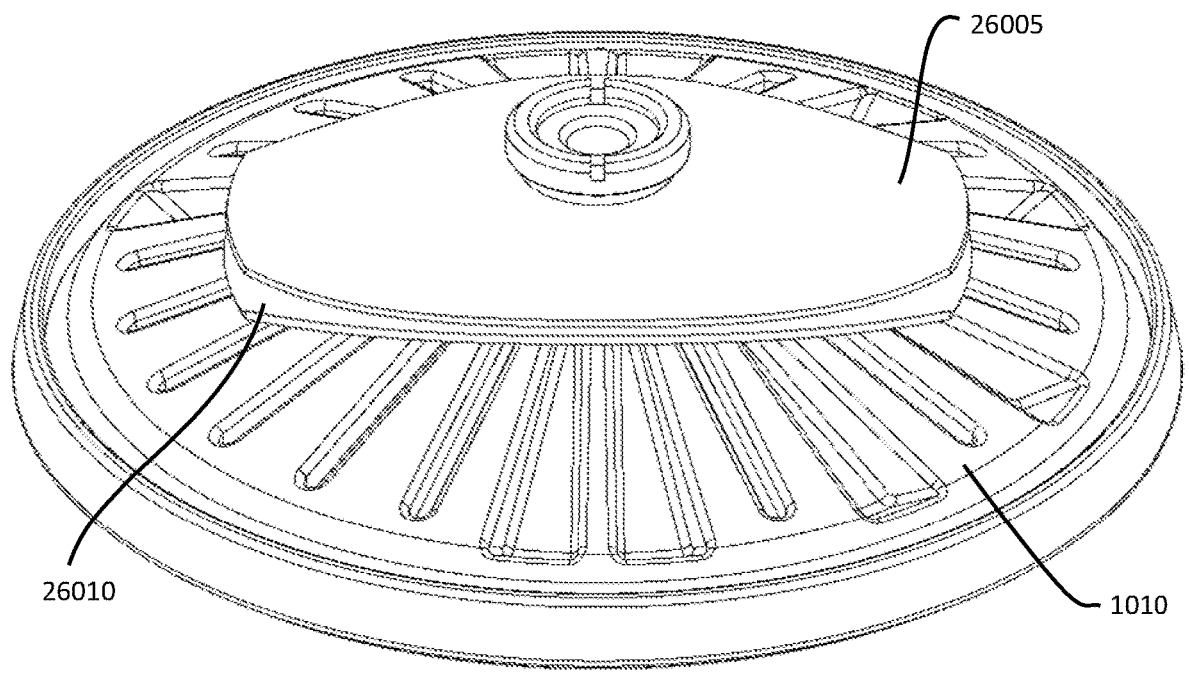
FIG. 26 is an isometric view of the conical disk, stabilizing spring, and damper of the shoe spring assembly shown in FIG. 24 with the foot-receiving plate removed for clarity.

In the embodiment shown in FIG. 24 and FIG. 25, a conical disk 1010 is shown in an assembly comprising a ring spring 3005, rigid foot-receiving plate 1005, nut 2010 and bolt 2020 fastener and housing 2055, with the nut and bolt fastener constraining the rigid foot-receiving plate 1005 to the conical disk 1010. In this embodiment, sandwiched between the rigid foot-receiving plate and the conical disk is a stabilizer spring 26005 and a damper 26010. The inventor contemplates that the bottom surface of rigid foot-receiving plate 1005 could be convex, as shown for example in FIG. 1. As shown in FIG. 25, the spring is clamped between the rigid foot-receiving plate and the apex of the conical disk. Thus, if the rigid foot-receiving plate 1005 is tilted by more than a predetermined amount (which may include being preloaded so it is in contact at all times) the lower surface of the spring 26005 would contact the damper located between the conical disk and the spring 26005, and thereby press against the upper surface of the conical disk through the damper 26010, subjecting the rigid foot-receiving plate 1005 to a righting effect. The damper 26010 is designed to undergo shear stress as the spring assembly is compressed and the damper 26010 experiences a differential translation between the lower surface of the stabilizing spring 26005 and upper surface of the conical disk 1010. As shown in FIG. 25, the stabilizer spring 26005 has a recurve-bow-like profile in which the ends of the stabilizing spring 26005 curve away from the conical disk 1010 to prevent the ends of the aforementioned spring 26005 from digging into the upper surface of the conical disk 1010. In FIG. 26 the rigid foot-receiving plate has been removed to show the stabilizer spring 26005 and damper 26010. In this figure, the front of the disk is the portion furthest from the user and the back of the disk is the portion closest to the user. As shown in this figure, the stabilizing spring 26005 and damper 26010 are wider in the directions to the left and the right of the user's foot than in the directions to the front and back of the user's foot. This would provide a greater stabilizing effect resisting tilting in the directions the left and right of the user's foot than its resistance to tilting in the directions forward of or behind the user's foot. This would allow a pitching movement of the user's ankle with minimal resistance from the spring as it rotates front to back as the user walks, but would resist side to side rolling motion.

The embodiments of the invention in which an exclusive property or privilege is claimed are defined as follows:

1. An energy return device for footwear, comprising:
   a flattenable conical disk having a base having an outer diameter, an apex generally radially centered within the outer diameter, a conical disk through-hole at the apex, and an upper surface;
   a ring spring arranged around the outer diameter of the base of the flattenable conical disk, the ring spring arranged to be circumferentially elongated when the device is compressed under a weight of a user against ground contact force to flatten the conical disk; and a rigid upper heel-receiving plate to receive the user's heel, the rigid heel-receiving plate having a lower surface facing the upper surface of the flattenable conical disk and the upper heel-receiving plate having a corresponding through-hole arranged to couple with the conical disk through-hole, the upper heel-receiving plate being rigidly connected to the apex of the flattenable conical disk, the apex of the flattenable conical disk by a fastener connecting the heel-receiving plate to the flattenable conical disk via the conical disk through-hole and the corresponding through-hole so that the flattenable conical disk must deform other than at the apex itself in order for the heel-receiving plate to change angle relative to the base of the flattenable conical disk, being radially inward from a live hinge forming a part of the flattenable conical disk and adapted to allow symmetric flexing of the conical disk around the apex, while resisting tilting of the apex.

2. The device of claim 1 wherein a lower end of the fastener includes a flange that extends to the live hinge.

3. The device of claim 2 wherein the flange has a feature which nests into a recess of the conical disk that defines the live hinge.

4. The device of claim 1 wherein the fastener is a rivet.

5. The device of claim 1 wherein a bottom of the fastener contacts and compresses a damper at or near full compression.

6. The device of claim 5 wherein the fastener has a non-flat lower surface to interact with the damper progressively.

7. The device of claim 5 wherein the damper has a non-flat upper surface to interact with the fastener progressively.

8. The device of claim 1 wherein the fastener has an orifice to allow air flow in and out of the conical disk via the conical disk through-hole and the corresponding through-hole.

9. The device of claim 1 wherein the ring spring has a radially outer surface having a conical shape.

10. The device of claim 9 wherein the ring spring is radially thicker toward the bottom than the top.

11. The device of claim 1 wherein the upper heel-receiving plate is longer in a fore-aft direction than it is from side to side.

12. The device of claim 11 wherein the heel-receiving plate comprises an upper surface with a shape configured to support a human foot arch.

13. The device of claim 1 wherein the lower surface of the heel-receiving plate is a convex surface and defines a reference plane by an orientation of the convex surface adjacent to the apex and the convex lower surface angles away from the reference plane more gradually on the left and right portions of the convex surface than on at least one of a forward portion of the convex surface or a rearward portion of the convex surface.

14. The device of claim 13 wherein the left and right portions of the convex lower surface of the heel-receiving plate come into contact with an upper surface of the flattenable conical disk at full compression of the device, or in contact with an intermediate structure in contact with the upper surface of the flattenable conical disk at full compression.

15. The device of claim 14 wherein a compressible and/or deformable material is located between the lower surface of the heel-receiving plate and an upper surface of the flattenable conical disk.

16. The device of claim 15 wherein the compressible and/or deformable material is compressed and/or deformed at full compression as a result of interference with the upper surface of the conical disk and the lower surface of the upper heel-receiving plate.

17. The device of claim 1 in which the upper surface of the flattenable conical disk comprises pockets.

18. The device of claim 17 in which the pockets extend in a generally radial direction and are separated by generally radial walls, at least a wall of the generally radial walls having a cross-section of material at at least a radial distance from the apex that is smaller than a cross-section of void, at the radial distance from the apex, within a pocket adjacent to the at least a wall.

19. The device of claim 1 further comprising a conical damping disk of viscoelastic material between the lower surface of the heel-receiving plate and an upper surface of the conical disk.

20. The device of claim 19 wherein the lower surface of the heel-receiving plate has one or more downward-facing protrusions arranged to interact with the flattenable conical disk.

21. The device of claim 20 wherein the upper surface of the flattenable conical disk comprises pockets and said protrusions protrude into the pockets in the upper surface of the conical disk at full compression of the conical disk.

22. The device of claim 21 wherein said protrusions cause the conical damping disk of viscoelastic material to elongate circumferentially as the flattenable conical disk nears full compression.

23. The device of claim 19 wherein the viscoelastic damping disk is secured to the outer diameter of the flattenable conical disk and acts as an air seal between the outer diameter of the flattenable conical disk and a lower plate.

24. The device of claim 1 in which the flattenable conical disk is rotationally asymmetric.

25. The device of claim 24 in which the conical disk has one or more pockets and one or more slots, the one or more slots being circumferentially narrower than the one or more pockets.

26. An energy return device for footwear, comprising:
a flattenable conical disk having a base having an outer diameter, an apex generally radially centered within the outer diameter, and an upper surface;
a ring spring arranged around the outer diameter of the base of the flattenable conical disk, the ring spring arranged to be circumferentially elongated when the device is compressed under a weight of a user against ground contact force to flatten the conical disk; and
a rigid upper heel-receiving plate to receive the user's heel, the rigid heel-receiving plate having a lower surface facing the upper surface of the flattenable conical disk and the upper heel-receiving plate being rigidly connected to the apex of the flattenable conical disk, the apex of the flattenable conical disk being radially inward from a live hinge forming a part of the flattenable conical disk and adapted to allow symmetric flexing of the flattenable conical disk around the apex, while resisting tilting of the apex;
wherein the lower surface of the heel-receiving plate is a convex surface and defines a reference plane by an orientation of the convex surface adjacent to the apex and the convex lower surface angles away from the reference plane more gradually on the left and right portions of the convex surface than on at least one of a forward portion of the convex surface or a rearward portion of the convex surface.

27. The device of claim 26 wherein the left and right portions of the convex lower surface of the heel-receiving plate come into contact with an upper surface of the flattenable conical disk at full compression of the device, or in contact with an intermediate structure in contact with the upper surface of the flattenable conical disk at full compression.

28. The device of claim 27 wherein a compressible and/or deformable material is located between the lower surface of the heel-receiving plate and an upper surface of the flattenable conical disk.

29. The device of claim 28 wherein the compressible and/or deformable material is compressed and/or deformed at full compression as a result of interference with the upper surface of the flattenable conical disk and the lower surface of the upper heel-receiving plate.

30. An energy return device for footwear, comprising:
- a flattenable conical disk having a base having an outer diameter, an apex generally radially centered within the outer diameter, and an upper surface;
- a ring spring arranged around the outer diameter of the base of the flattenable conical disk, the ring spring arranged to be circumferentially elongated when the device is compressed under a weight of a user against ground contact force to flatten the conical disk; and
- a rigid upper heel-receiving plate to receive the user's heel, the rigid heel-receiving plate having a lower surface facing the upper surface of the flattenable conical disk and the upper heel-receiving plate being rigidly connected to the apex of the flattenable conical disk, the apex of the flattenable conical disk being radially inward from a live hinge forming a part of the flattenable conical disk and adapted to allow symmetric flexing of the flattenable conical disk around the apex, while resisting tilting of the apex;
- a conical damping disk of viscoelastic material between the lower surface of the heel-receiving plate and an upper surface of the flattenable conical disk, and
- wherein the viscoelastic damping disk is secured to the outer diameter of the flattenable conical disk and acts as an air seal between the outer diameter of the flattenable conical disk and a lower plate.

\* \* \* \* \*